United States Patent
Kubota et al.

(10) Patent No.: US 8,477,435 B2
(45) Date of Patent: *Jul. 2, 2013

(54) IMAGING LENS

(75) Inventors: Yoji Kubota, Nagano (JP); Kenichi Kubota, Nagano (JP); Hitoshi Hirano, Nagano (JP); Ichiro Kurihara, Tochigi (JP); Yoshio Ise, Tochigi (JP); Sumio Fukuda, Tochigi (JP)

(73) Assignee: Optical Logic Inc., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,762

(22) Filed: May 23, 2012

(65) Prior Publication Data

US 2012/0229922 A1 Sep. 13, 2012

Related U.S. Application Data

(63) Continuation of application No. PCT/JP2010/068445, filed on Oct. 20, 2010.

(30) Foreign Application Priority Data

Nov. 25, 2009 (JP) ................................. 2009-266973

(51) Int. Cl.
*G02B 9/34* (2006.01)
*G02B 13/18* (2006.01)

(52) U.S. Cl.
USPC ......................................... 359/774; 359/715

(58) Field of Classification Search
USPC .................................................. 359/774, 715
See application file for complete search history.

(56) References Cited

U.S. PATENT DOCUMENTS

2012/0200945 A1* 8/2012 Kubota et al. ................. 359/774

FOREIGN PATENT DOCUMENTS

| JP | 2000-105335 | 4/2000 |
|----|-------------|--------|
| JP | 2007-122007 | 5/2007 |
| JP | 2009-156950 | 7/2009 |
| JP | 2009-223085 | 10/2009 |

\* cited by examiner

*Primary Examiner* — Scott J Sugarman
(74) *Attorney, Agent, or Firm* — Kubotera & Associates LLC

(57) ABSTRACT

An imaging lens, although compact, has satisfactorily corrected aberrations. The imaging lens is configured by disposing, in sequence from the object side, a stop (ST); a first lens (L1), which has a double convex shape near the optical axis; a meniscus-shaped negative second lens (L2) which has near the optical axis a convex surface facing the object side; a meniscus-shaped positive third lens (L3) which has near the optical axis a concave surface facing the object side; and a positive fourth lens (L4) which has a double convex shape near the optical axis. In the configuration, the refractive power of the first lens (L1) is greater than the refractive power of each of the second lens (L2), the third lens (L3), and the fourth lens (L4).

9 Claims, 15 Drawing Sheets

IMAGING LENS

CROSS-REFERENCE TO RELATED APPLICATIONS

This is a continuation application of the prior PCT application PCT/JP2010/068445, filed on Oct. 20, 2010, pending, which claims priority from a Japanese patent application No. 2009-266973, filed on Nov. 25, 2009, the entire content of which is incorporated herein by reference.

TECHNICAL FIELD AND BACKGROUND ART

The present invention generally relates to an imaging lens that forms an image of an object on an imaging element such as a CCD sensor and a CMOS sensor. More particularly, the present invention relates to an imaging lens to be mounted on a relatively small camera, such as a cellular phone, a digital still camera, a portable information terminal, a security camera, an in-vehicle camera, and a network camera.

In the recent years, cameras are included as a standard feature in most of cellular phone, so that the values added to those cellular phone are increased. The integration of the cellular phone and the digital still cameras has been developed year after year to a point where some cellular phone are equipped with cameras having optical performance and various functions comparable to those of digital still cameras. However, the principal function of the cellular phone is still a communication function, and, even today, those cellular phone are naturally expected to have basic characteristics such as a small size and a light weight.

In response to the trend of the size and weight reductions in the cellular phone, there has been a demand for smaller imaging lenses to be mounted on the cellular phone. Conventionally, sufficient optical performance in accordance with the resolutions of imaging elements and miniaturization have been both realized with imaging lenses having a two-lens or three-lens configuration. However, required optical performance has become higher every year in line with higher resolutions of imaging elements, and it has become difficult to realize high optical performance with appropriately-corrected aberrations and miniaturization at the same time depending on a two-lens or three-lens configuration.

For this reason, there have been studies in adding another lens, i.e., an imaging lens with a four-lens configuration. For example, an imaging lens disclosed in Patent Literature 1 is formed with a first lens that has a convex surface on the object side and is positive, a second lens having a negative meniscus shape with a concave surface facing the object side, a third lens having a positive meniscus shape with a convex surface facing the object side, and a fourth lens having a positive meniscus shape with a convex surface facing the object side, arranged in this order from the object side.

In such a configuration, preferred ranges are set for a ratio of a focal length of each of the first to the third lenses to the focal length of the lens system, for the refractive index of the first lens, and for the Abbe number of the first lens. Those values are restricted within the preferred ranges, so that it is possible to realize preferable optical performance while restraining an increase in a length of the imaging lens.
Citation List
Patent Literature 1: Japanese Patent Publication No. 2007-122007

With the above described imaging lens disclosed in Patent Literature 1, relatively preferable aberrations can be obtained. However, the cellular phone has been becoming smaller and highly functional every year, and there is a demand for very small imaging lenses.

With the lens configuration disclosed in Patent Literature 1, it is difficult to satisfy such a demand and realize imaging lens miniaturization and appropriate aberration corrections at the same time. It should be noted that simultaneous realization of miniaturization and appropriate aberration corrections is not a challenge only for the imaging lenses to be mounted on the cellular phone, but is a common challenge for the imaging lenses to be mounted on relatively small cameras such as digital still cameras, portable information terminals, security cameras, in-vehicle cameras, and network cameras.

The present invention has been made in view of the above described problems in the conventional art, and an object thereof is to provide an imaging lens that can appropriately correct aberrations though a small size configuration.

SUMMARY OF INVENTION

To solve the above problems, the present invention provides an imaging lens that includes a first lens having positive refractive power, a second lens having negative refractive power, a third lens having positive refractive power, and a fourth lens having positive refractive power that are arranged in this order from the object side to the image plane side. The first lens is configured to have such a shape that the curvature radius of the object-side surface thereof is positive. The second lens is configured to have such a shape that the curvature radius of the object-side surface thereof and the curvature radius of the image-side surface thereof are both positive. The third lens is configured to have such a shape that the curvature radius of the object-side surface thereof and the curvature radius of the image-side surface thereof are both negative. The fourth lens is configured to have such a shape that the curvature radius of the object-side surface thereof is positive, and the curvature radius of the image-side surface thereof is negative.

In the imaging lens having the above described configuration, of the four lenses with the positive refractive power, the negative refractive power, the positive refractive power, and the positive refractive power arranged in this order, the second lens is configured to have such a shape that forms a negative meniscus lens having a convex surface facing the object side in the vicinity of the optical axis, and the third lens is configured to have such a shape that forms a positive meniscus lens having a concave surface facing the object side in the vicinity of the optical axis. Therefore, in the imaging lens according to the present invention, the second lens and the third lens are arranged to have concave surfaces facing each other. Accordingly, with such a configuration serving as an imaging lens, imaging lens miniaturization can be realized while respective aberrations are appropriately corrected.

Further, in the imaging lens having the above described configuration, the first lens is configured to have higher refractive power than the second lens, the third lens, and the fourth lens. With this arrangement, imaging lens miniaturization can be more suitably realized.

In the imaging lens having the above described configuration, the following conditional expression (1) is preferably satisfied:

$$-0.9 < f1/f2 < -0.5 \qquad (1)$$

where f1 represents the focal length of the first lens, and f2 represents the focal length of the second lens.

The conditional expression (1) indicates the conditions for shortening the length (thickness) of the imaging lens along the optical axis, and restricting the axial chromatic aberration, the off-axis chromatic aberration of magnification, the spherical aberration, and the field curvature within preferred ranges in a well-balanced manner.

If "f1/f2" exceeds the upper limit value "−0.5," the refractive power of the second lens becomes low relative to the refractive power of the first lens, and the corrections of the axial chromatic aberration and the off-axis chromatic aberration of magnification become insufficient (that of a short wavelength increases in the negative direction with respect to that of a reference wavelength). Since the correction of the spherical aberration also becomes insufficient, the off-axis best image surface is tilted with respect to the axial best image surface, and obtaining a flat imaging surface becomes difficult.

If "f1/f2" becomes smaller than the lower limit value "−0.9," on the other hand, the refractive power of the second lens becomes high relative to the refractive power of the first lens, and corrections of the axial chromatic aberration and the off-axis chromatic aberration of magnification become excessive (that of the short wavelength increase in the positive direction with respect to that of the reference wavelength). Since the correction of the spherical aberration also becomes excessive, the off-axis best image surface is tilted with respect to the axial best image surface, and obtaining a flat imaging surface becomes difficult. Therefore, in either case, it is difficult to achieve preferable imaging performance.

In the imaging lens having the above described configuration, the following conditional expression (2) is preferably satisfied:

$$0.1 < da/L14 < 0.4 \tag{2}$$

where da represents the sum of the distance from the image-side surface of the first lens to the object-side surface of the second lens on the optical axis, the distance from the image-side surface of the second lens to the object-side surface of the third lens on the optical axis, and the distance from the image-side surface of the third lens to the object-side surface of the fourth lens on the optical axis, and L14 represents the distance from the object-side surface of the first lens to the image-side surface of the fourth lens on the optical axis.

The conditional expression (2) defines the proportion of the sum of the respective distances between the lenses in the whole lens system, and indicates the conditions for securing the workability of each lens while miniaturizing the imaging lens, and restricting the aberrations caused by the surface shapes of the respective lenses, particularly the field curvature, within preferred ranges.

If "da/L14" exceeds the upper limit value "0.4," the thickness of each lens becomes smaller, and it becomes difficult to restrict the respective aberrations within preferred ranges in a well-balanced manner. Particularly, it becomes difficult to restrict the field curvature in a preferred range. The field curvature can be reduced by providing inflection points in the lens located close to the image plane. In such a case, however, imaging performance is degraded due to decentering (axis deviation) or tilting of the lens, for example.

If "da/L14" becomes smaller than the lower limit value "0.1," on the other hand, the thickness of each lens becomes greater, and the workability of each lens becomes higher. However, it becomes difficult to restrict the respective aberrations within preferred ranges in a well-balanced manner.

In the imaging lens having the above described configuration, it is preferable to further satisfy the following conditional expression (2A):

$$0.1 < da/L14 < 0.2 \tag{2A}$$

As the conditional expression (2A) is satisfied, aberrations caused by the surface shapes of the respective lenses can be restricted within more preferred ranges, while imaging lens miniaturization is suitably realized.

In the imaging lens having the above described configuration, the following conditional expression (3) is preferably satisfied:

$$0.05 < f12/f34 < 0.5 \tag{3}$$

where f12 represents a composite focal length of the first lens and the second lens, and f34 represents a composite focal length of the third lens and the fourth lens.

The conditional expression (3) indicates the conditions for restricting the off-axis chromatic aberration of magnification and the spherical aberration within preferred ranges in a well-balanced manner while reducing the thickness of the imaging lens. This conditional expression (3) also indicates the conditions for restricting the incidence angles of light beams emitted from the imaging lens to imaging elements within a predetermined range, and restricting the field curvature within a preferred range, at a maximum image height. As is well known, light beams that can be captured into imaging elements have a so-called maximum incidence angle as the limit of incidence angle, in view of the structures of the imaging elements. In a case where light beams that are outside the maximum incidence angle range enter the imaging elements, the obtained image has a dark peripheral portion due to a shading phenomenon. Therefore, the incidence angles of light beams emitted from the imaging lens to imaging elements need to be restricted within a predetermined range.

If "f12/f34" exceeds the upper limit value "0.5" in the above conditional expression (3), the composite focal length of the first lens and the second lens becomes long relative to the composite focal length of the third lens and the fourth lens. This is advantageous for restraining the incidence angles of light beams emitted from the imaging lens to imaging elements within a predetermined range. However, the correction of the off-axis chromatic aberration of magnification becomes insufficient (that of the short wavelength increase in the negative direction with respect to that of the reference wavelength), and it becomes difficult to achieve preferred imaging performance. As the effective diameters of the third lens and the fourth lens become larger, it becomes difficult to miniaturize the imaging lens, and it also becomes difficult to obtain a flat imaging surface due to an increase in astigmatic difference.

If "f12/f34" becomes smaller than the lower limit value "0.05" in the conditional expression (3), on the other hand, the composite focal length of the first lens and the second lens becomes short relative to the composite focal length of the third lens and the fourth lens, and the refractive power of the lens system is gathered in the first lens and the second lens. Accordingly, the imaging lens can be advantageously miniaturized, but it becomes difficult to restrict the spherical aberration and the coma aberration within preferred ranges in a well-balanced manner. Further, the incidence angles of off-axis light beams emitted from the imaging lens to imaging elements become larger, and it becomes difficult to restrain the incidence angles of light beams emitted from the imaging lens to the imaging elements within a predetermined range.

In the imaging lens having the above described configuration, it is preferable to further satisfy the following conditional expression (3A):

$$0.05 < f12/f34 < 0.3 \tag{3A}$$

In the imaging lens having the above described configuration, the following conditional expression (4) is preferably satisfied:

$$0.5 < L14/f < 0.8 \quad (4)$$

where f represents the focal length of the whole lens system, and L14 represents the distance from the object-side surface of the first lens to the image-side surface of the fourth lens on the optical axis.

The conditional expression (4) indicates the conditions for reducing the thickness of the imaging lens while appropriately correcting aberrations. If "L14/f" exceeds the upper limit value "0.8," the distance from the object-side surface of the first lens to the image-side surface of the fourth lens on the optical axis becomes longer relative to the focal length, and it becomes difficult to miniaturize the imaging lens.

If "L14/f" becomes smaller than the lower limit value "0.5," the imaging lens is advantageously miniaturized, but the thickness of each of the lenses constituting the imaging lens becomes extremely small. As a result, the workability and productivity become much lower. Further, it becomes difficult to appropriately correct aberrations.

In the imaging lens having the above described configuration, it is more preferable to satisfy the following conditional expressions (5) to (7):

$$50 < vd1 < 85 \quad (5)$$

$$vd2 < 30 \quad (6)$$

$$50 < vd4 < 85 \quad (7)$$

where vd1 represents the Abbe number of the first lens, vd2 represents the Abbe number of the second lens, and vd4 represents the Abbe number of the fourth lens.

As the conditional expressions (5) to (7) are satisfied, chromatic aberrations can be appropriately corrected. If the Abbe numbers of the respective lenses do not satisfy the conditional expressions (5) to (7), the correction of the axial chromatic aberration becomes insufficient, and it becomes difficult to achieve preferred imaging performance.

In the imaging lens having the above described configuration, to more appropriately correct the axial chromatic aberration and the off-axis chromatic aberration of magnification, it is preferable to further satisfy the following conditional expression (8):

$$|vd1 - vd4| < 10 \quad (8)$$

In the imaging lens having the above described configuration, to appropriately correct chromatic aberrations, the following conditional expression (9) is preferably satisfied:

$$|vd2 - vd3| < 10 \quad (9)$$

where vd3 represents the Abbe number of the third lens.

If the material of the first lens, the material of the third lens, and the material of the fourth lens are the same in the imaging lens having the above described configuration, only two kinds of materials are required in the formation of the imaging lens. Accordingly, the imaging lens production cost can be lowered. Further, the material of the first lens and the material of the fourth lens may be the same, and the material of the second lens and the material of the third lens may be the same. With this arrangement, the imaging lens production cost can also be lowered while chromatic aberrations are appropriately corrected.

The present invention can provide a small-sized imaging lens. With this imaging lens of the present invention, imaging lens miniaturization and excellent aberration corrections are both realized, and respective aberrations are appropriately corrected.

DETAILED DESCRIPTION OF PREFERRED EMBODIMENTS

Hereinafter, an embodiment of the present invention is described in detail with reference to the drawings.

FIGS. 1, 4, 7, 10, and 13 are cross-sectional views of imaging lens according to Numerical Examples 1 to 5 of this embodiment. In the respective Numerical Examples, the lens configurations are basically the same, and therefore, the lens configuration of an imaging lens according to this embodiment is described in the following, with reference to the cross-sectional view of the imaging lens of Numerical Example 1.

Figure 1:
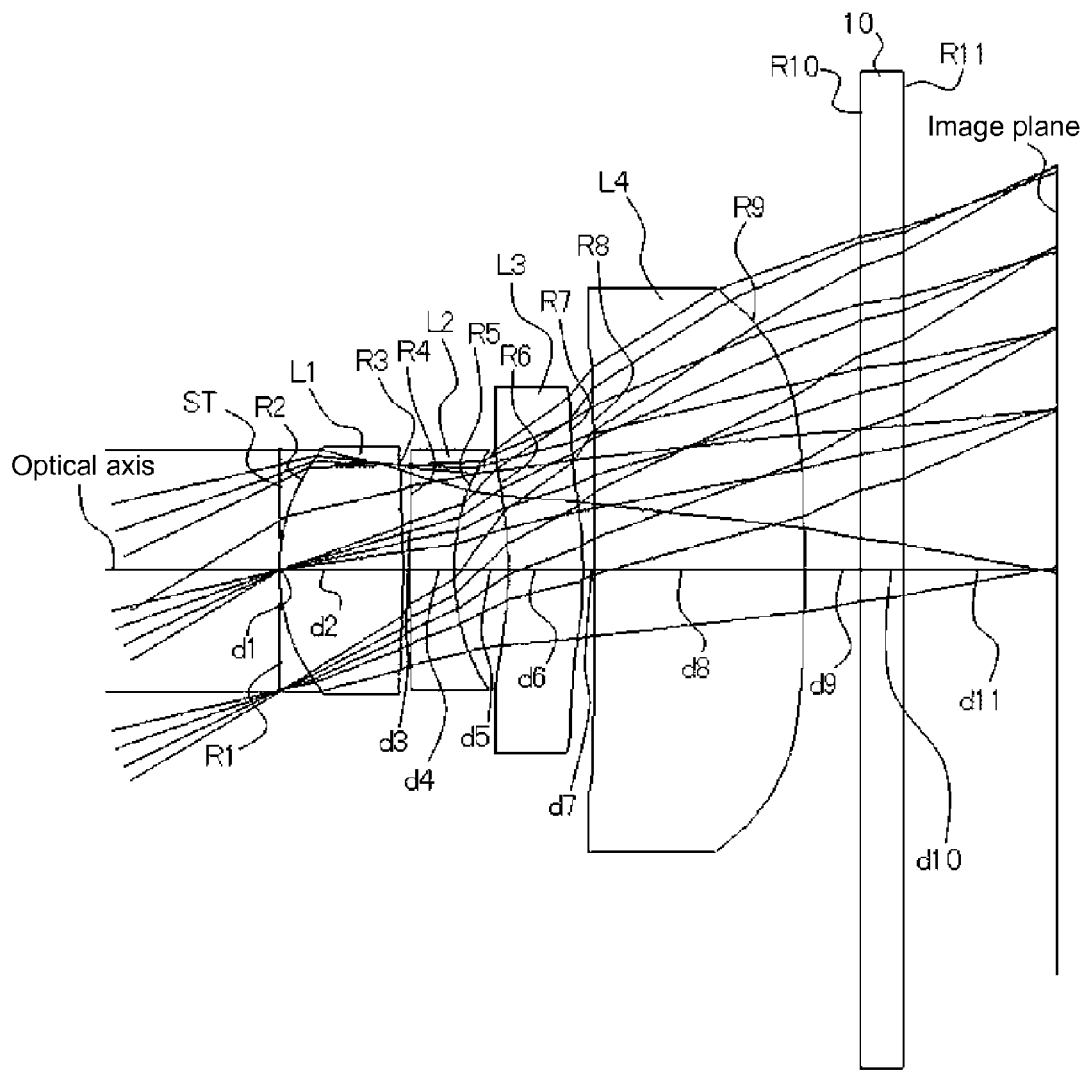
FIG. 1 is a cross-sectional view schematically showing an imaging lens according to Numerical Example 1 of an embodiment of the present invention.

As shown in FIG. 1, an imaging lens of this embodiment includes an aperture stop ST, a first lens L1 with positive refractive power, a second lens L2 with negative refractive power, a third lens L3 with positive refractive power, and a fourth lens L4 with positive refractive power, which are arranged in this order from the object side to the image plane side. A cover glass 10 is provided between the fourth lens L4 and the image plane. This cover glass 10 may not be provided. In this embodiment, the aperture stop is placed on the tangent plane of the vertex on the object side surface of the first lens L1. The position of the aperture stop is not limited to the position in this embodiment, but may be located closer to the object side than to the tangent plane of the vertex on the object-side surface of the first lens L1 or between the tangent plane of the vertex and the image-side surface of the first lens L1.

In the imaging lens having the above described configuration, the first lens L1 is configured to have such a shape that the curvature radius R2 of the object-side surface is positive, and the curvature radius R3 of the image-side surface is negative. That is, the first lens L1 is configured to have such a shape that forms a biconvex lens in the vicinity of the optical axis. The first lens L1 is also configured to have higher refractive power than the second lens L2, the third lens L3, and the fourth lens L4. It should be noted that the shape of the first lens L1 is not limited to such a shape that forms a biconvex lens in the vicinity of the optical axis, as long as the curvature radius R2 of the object-side surface is positive. Each of Numerical Examples 1 to 3 is an example in which the first lens L1 forms a biconvex lens in the vicinity of the optical axis, and each of Numerical Examples 4 and 5 is an example in which the first lens L1 has such a shape that the curvature radiuses R2 and R3 are both positive, or a meniscus lens having a convex surface facing the object side is formed in the vicinity of the optical axis.

The second lens L2 is configured to have such a shape that the curvature radius R4 of the object-side surface and the curvature radius R5 of the image-side surface are both positive, and a meniscus lens having a convex surface facing the object side is formed in the vicinity of the optical axis. Further, the third lens L3 is configured to have such a shape that the curvature radius R6 of the object-side surface and the curvature radius R7 of the image-side surface are both negative, and a meniscus lens having a concave surface facing the object side is formed in the vicinity of the optical axis. In this manner, the second lens L2 and the third lens L3 are arranged to have concave surfaces facing each other in the vicinity of the optical axis.

The fourth lens L4 is configured to have such a shape that the curvature radius R8 of the object-side surface is positive, and the curvature radius R9 of the image-side surface is negative. That is, the fourth lens L4 is configured to have such a shape that forms a biconvex lens in the vicinity of the optical axis.

An imaging lens according to this embodiment satisfies the following conditional expressions (1) to (4). Accordingly, with an imaging lens according to this embodiment, miniaturization of the imaging lens and excellent aberration corrections can be realized at the same time.

$$-0.9 < f1/f2 < -0.5 \quad (1)$$

$$0.1 < da/L14 < 0.4 \quad (2)$$

$$0.05 < f12/f34 < 0.5 \quad (3)$$

$$0.5 < L14/f < 0.8 \quad (4)$$

where f represents the focal length of the whole lens system, f1 represents the focal length of the first lens L1, f2 represents the focal length of the second lens L2, da represents the sum of the distance from the image-side surface of the first lens L1 to the object-side surface of the second lens L2 on the optical axis, the distance from the image-side surface of the second lens L2 to the object-side surface of the third lens L3 on the optical axis, and the distance from the image-side surface of the third lens L3 to the object-side surface of the fourth lens L4 on the optical axis, L14 represents the distance from the object-side surface of the first lens L1 to the image-side surface of the fourth lens L4 on the optical axis, f12 represents the composite focal length of the first lens L1 and the second lens L2, and f34 represents the composite focal length of the third lens L3 and the fourth lens L4.

To appropriately correct chromatic aberrations, an imaging lens according to this embodiment satisfies the following conditional expressions (5) to (7), as well as the above conditional expressions (1) to (4):

$$50 < vd1 < 85 \quad (5)$$

$$vd2 < 30 \quad (6)$$

$$50 < vd4 < 85 \quad (7)$$

where vd1 represents the Abbe number with respect to the d-line of the first lens L1, vd2 represents the Abbe number with respect to the d-line of the second lens L2, and vd4 represents the Abbe number with respect to the d-line of the fourth lens L4.

An imaging lens according to this embodiment further satisfies the following conditional expression (8):

$$|vd1 - vd4| < 10 \quad (8)$$

As the conditional expression (8) is satisfied, axial chromatic aberrations and off-axis chromatic aberrations of magnification are more appropriately corrected.

It should be noted that not all the above conditional expressions (1) to (8) need to be satisfied, and the function effects corresponding to the respective conditional expressions can be achieved independently of one another by satisfying the conditional expressions independently of one another.

In this embodiment, the lens surfaces of each lens are formed with aspherical surfaces as needed. Where Z represents the axis in the optical axis direction, H represents the height in a direction perpendicular to the optical axis, k represents the conical coefficient, and $A_4, A_6, A_8, A_{10}, A_{12}, A_{14}$, and $A_{16}$ represent aspherical coefficients, the aspherical form used as each of the lens surfaces is expressed by the following equation:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Next, the numerical examples of imaging lenses according to this embodiment are described. In each of the numerical examples, f represents the focal length of the whole lens system, Fno represents the F-number, and ω represents a half angle of view. Further, i represents the surface numbers counted from the object side, R represents the curvature radiuses, d represents the lengths between lens surfaces on the optical axis (surface intervals), Nd represents the refractive indexes with respect to the d-line, and vd represents the Abbe numbers with respect to the d-line. It should be noted that each surface number i with an addition of * (asterisk) represents an aspherical surface.

First, Numerical Examples 1 to 3 of imaging lenses according to this embodiment are described. The imaging lenses according to Numerical Examples 1 to 3 satisfy the following conditional expressions (2A) and (3A), as well as the above conditional expressions (1) to (8):

$$0.1 < da/L14 < 0.2 \quad (2A)$$

$$0.05 < f12/f34 < 0.3 \quad (3A)$$

In each of the imaging lenses according to Numerical Examples 1 to 3, the first lens L1, the third lens L3, and the fourth lens L4 are made of the same material. The imaging lenses according to Numerical Examples 1 to 3 satisfy the condition, "the Abbe number vd1 of the first lens L1=the Abbe number vd3 of the third lens L3=the Abbe number vd4 of the fourth lens L4."

NUMERICAL EXAMPLE 1

The basic lens data are as follows:

f = 4.792 mm, Fno = 2.800, ω = 30.94°
Unit mm

Surface data

| Surface number i | R | d | Nd | vd |
|---|---|---|---|---|
| (Object) | ∞ | ∞ | | |
| 1 (stop) | ∞ | 0.0000 | | |
| 2* | 1.420 | 0.8700 | 1.52470 | 56.2 (=vd1) |
| 3* | −7.220 | 0.0500 | | |
| 4* | 16.150 | 0.3160 | 1.61420 | 26.0 (=vd2) |
| 5* | 1.660 | 0.3820 | | |
| 6* | −3.060 | 0.5300 | 1.52470 | 56.2 (=vd3) |
| 7* | −3.110 | 0.0800 | | |
| 8* | 80.000 | 1.4890 | 1.52470 | 56.2 (=vd4) |
| 9* | −24.000 | 0.4000 | | |
| 10 | ∞ | 0.3000 | 1.51633 | 64.12 |
| 11 | ∞ | 1.0924 | | |
| (Image plane) | ∞ | | | | f1 = 2.343
f2 = −3.038
f12 = 4.878
f34 = 26.959
da = 0.512
L14 = 3.717

Aspherical surface data

Second surface k = 7.124138E−01, $A_4$ = −3.255467E−02, $A_6$ = −3.345029E−02,
$A_8$ = 6.443935E−02, $A_{10}$ = −8.410124E−02

Third surface k = 7.650370E+01, $A_4$ = 6.319932E−03, $A_6$ = 3.587828E−01,
$A_8$ = −3.390403E−01, $A_{10}$ = −3.205488E−02

Fourth surface k = 0.000000, $A_4$ = −7.977956E−02, $A_6$ = 2.264327E−01,
$A_8$ = 1.561367E−01, $A_{10}$ = −7.007116E−01

Fifth surface k = −7.378725E−01, $A_4$ = −5.955688E−02, $A_6$ = 3.026794E−01,
$A_8$ = −1.537807E−01, $A_{10}$ = −8.573522E−02

Sixth surface k = 0.000000, $A_4$ = 7.704037E−03, $A_6$ = 9.406414E−02,
$A_8$ = −3.842276E−02, $A_{10}$ = −2.456153E−02,
$A_{12}$ = 1.710539E−02, $A_{14}$ = 4.229176E−02, $A_{16}$ = −8.107767E−02

Seventh surface k = −2.354755, $A_4$ = 4.800647E−02, $A_6$ = 3.015033E−02,
$A_8$ = −3.352903E−03, $A_{10}$ = −4.870813E−03, $A_{12}$ = −1.874400E−03,
$A_{14}$ = −3.102981E−04, $A_{16}$ = 1.104519E−04 f = 4.792 mm, Fno = 2.800, ω = 30.94°
Unit mm

Eighth surface k = 0.000000, $A_4$ = −1.928571E−02, $A_6$ = 7.510676E−03,
$A_8$ = −1.975988E−03, $A_{10}$ = 4.959047E−04, $A_{12}$ = 3.811335E−04,
$A_{14}$ = 1.738822E−05, $A_{16}$ = −8.256141E−05

Ninth surface k = −1.000000E+03, $A_4$ = −1.514598E−02, $A_6$ = −1.263258E−02,
$A_8$ = 4.078326E−03, $A_{10}$ = −5.722523E−04, $A_{12}$ = −5.728760E−05,
$A_{14}$ = 1.467244E−05, $A_{16}$ = 1.257680E−07

The values in the respective conditional expressions are as follows:

f1/f2=−0.771 da/L14=0.138 f12/f34=0.181

L14/f=0.776 vd1=56.2 vd2=26.0 vd3=56.2 vd4=56.2

|vd1−vd4|=0

As described above, the imaging lens according to Numerical Example 1 satisfies the conditional expressions (1) to (8) and the conditional expressions (2A) and (3A). Accordingly, with the imaging lens according to Numerical Example 1, imaging lens miniaturization can be suitably realized, and aberrations can be more appropriately corrected.

Further, in the imaging lens according to Numerical Example 1, the material of the first lens L1, the material of the third lens L3, and the material of the fourth lens L4 are the same. Accordingly, the production cost can be made lower than those in a case where the first lens L1 to fourth lens L4 are made of different materials from one another.

Figure 2:
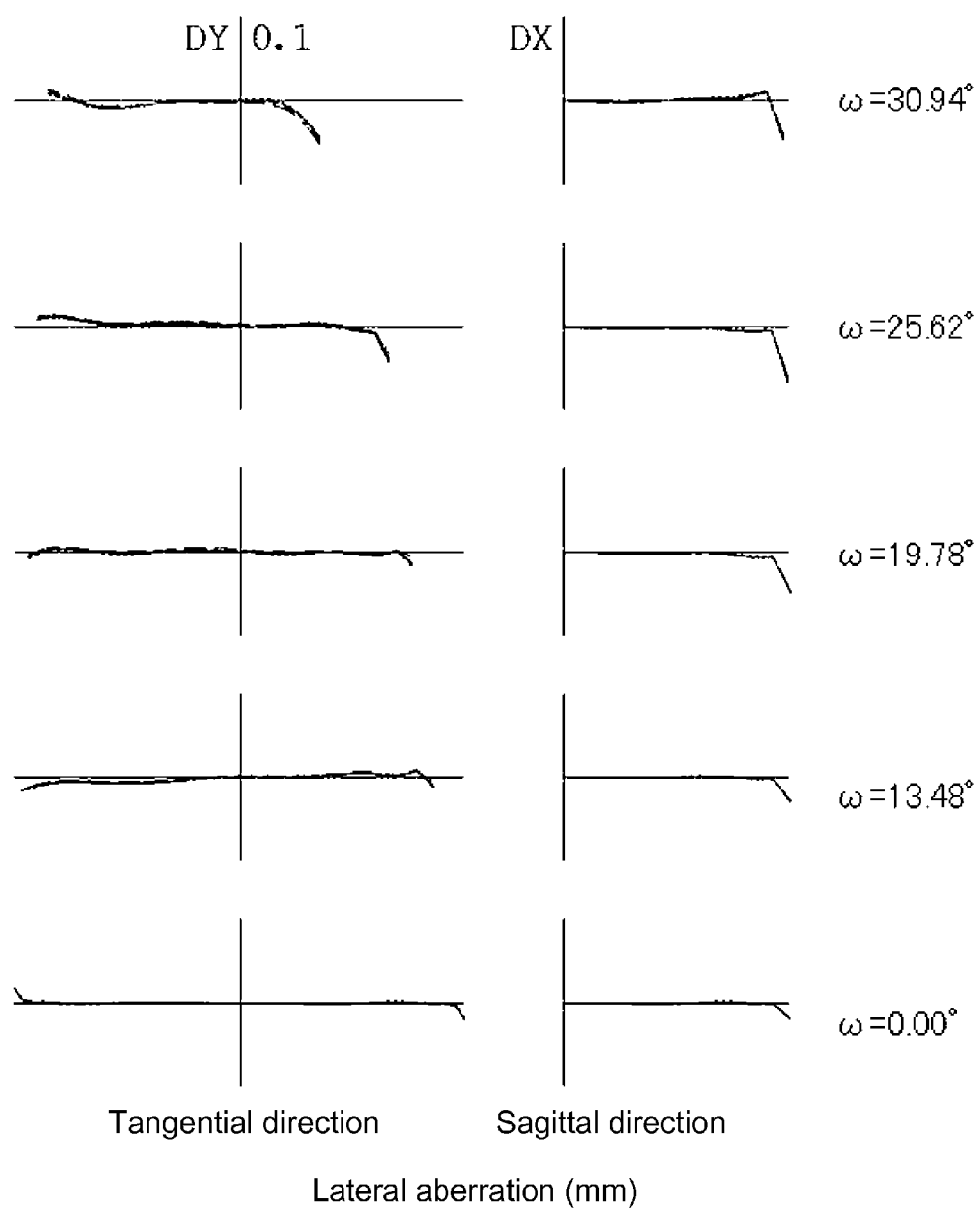
FIG. 2 is an aberration diagram showing lateral aberrations of the imaging lens shown in FIG. 1.
Figure 3:
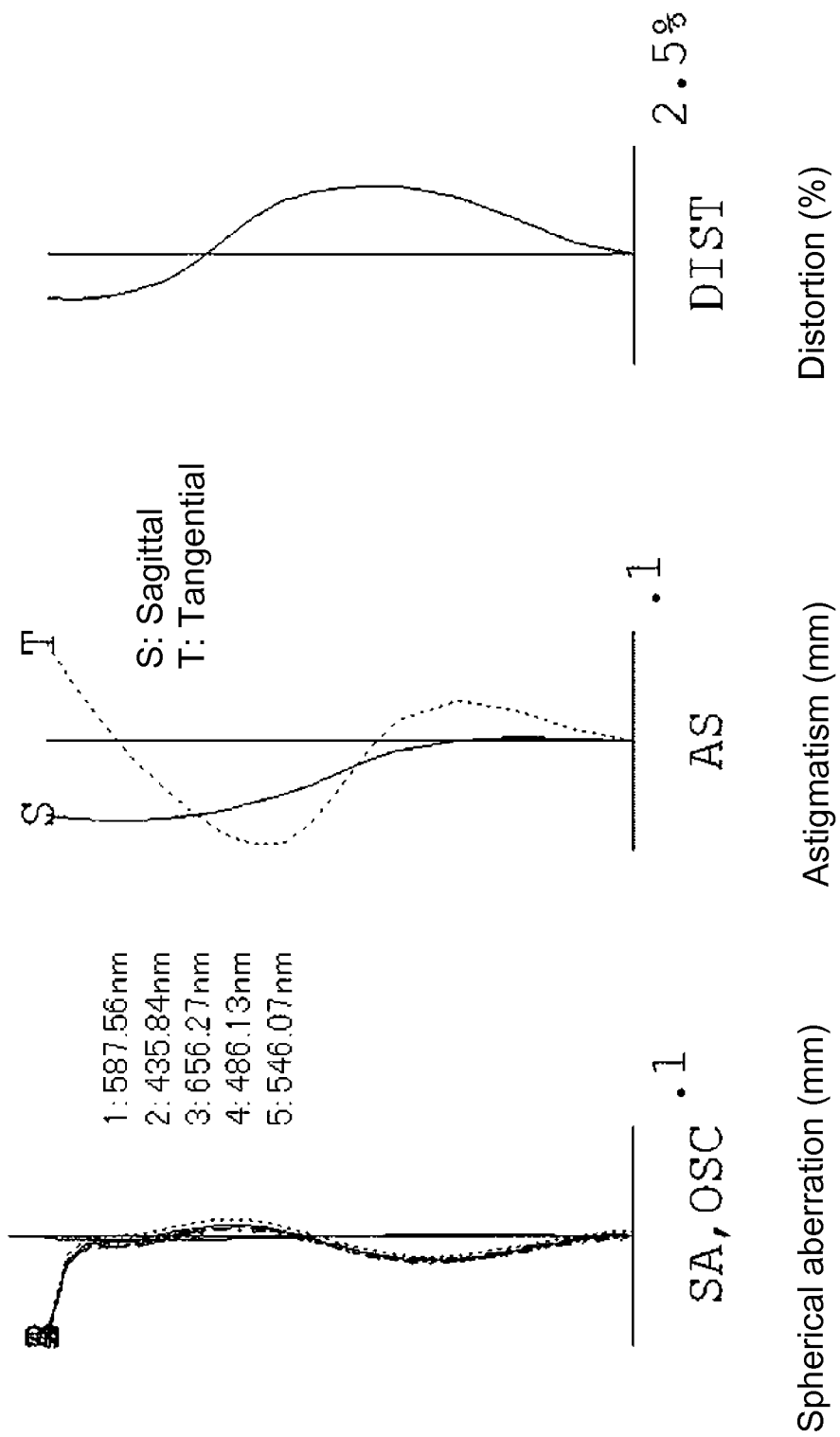
FIG. 3 is an aberration diagram showing spherical aberration, astigmatism, and distortion of the imaging lens shown in FIG. 1.
Figure 4:
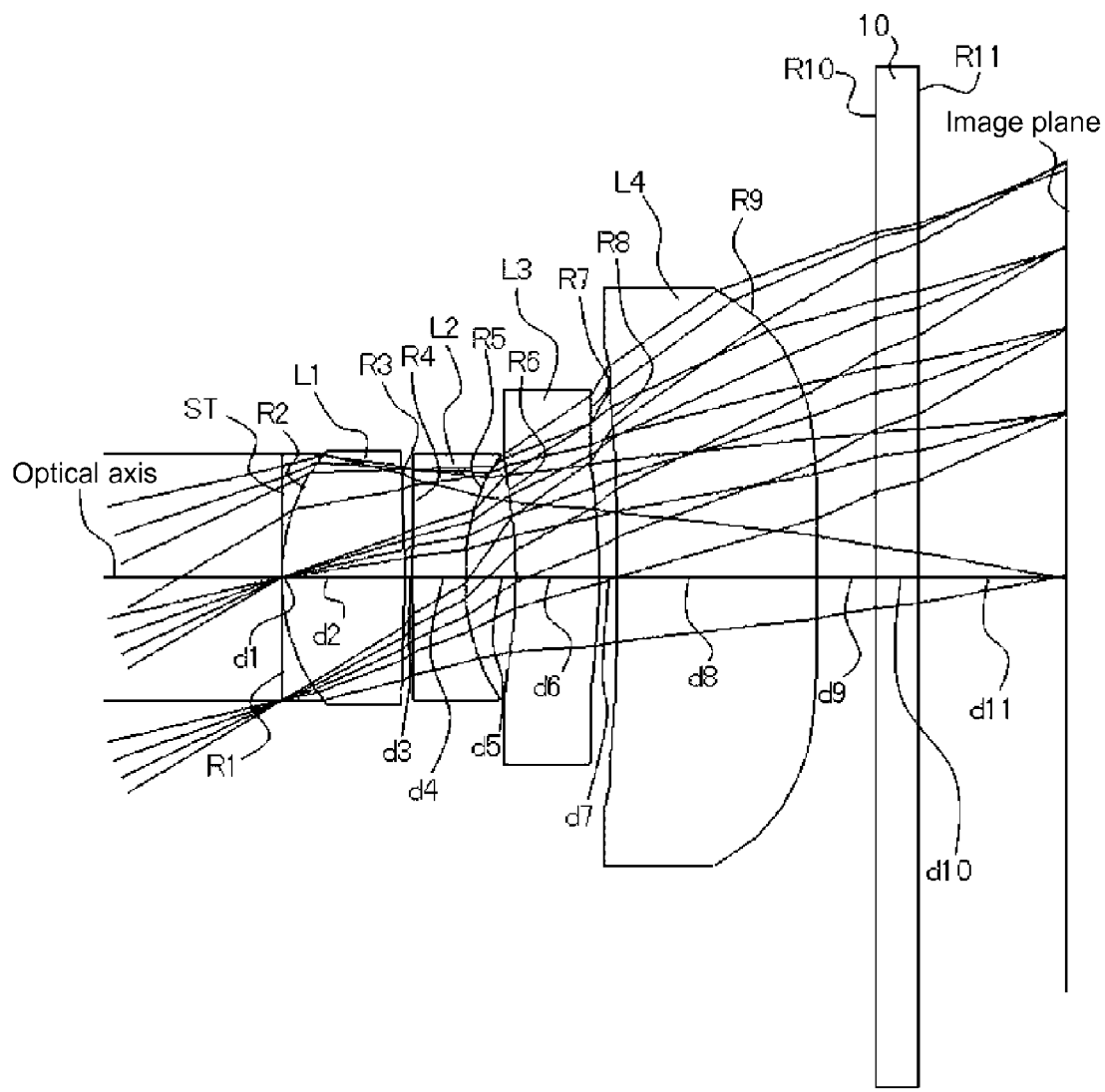
FIG. 4 is a cross-sectional view schematically showing an imaging lens according to Numerical Example 2 of an embodiment of the present invention.

FIG. 2 shows the lateral aberrations corresponding to a half angle of view ω in the imaging lens according to Numerical Example 1, with respect to the tangential direction and the sagittal direction (the same applies in FIGS. 5, 8, 11, and 14). FIG. 3 shows the spherical aberration SA (mm), the astigmatism AS (mm), and the distortion DIST (%) in the imaging lens of Numerical Example 1. Of those aberration diagrams, the spherical aberration diagram shows the offence against the sine condition OSC, as well as the aberrations at the respective wavelengths of 587.56 nm, 435.84 nm, 656.27 nm, 486.13 nm, and 546.07 nm. The astigmatism diagram shows the aberration on the sagittal image surface S and the aberration on the tangential image surface T (the same applies in FIGS. 6, 9, 12, and 15). As shown in FIGS. 2 and 3, respective aberrations can be suitably corrected with the imaging lens according to Numerical Example 1.

NUMERICAL EXAMPLE 2

The basic lens data are as follows:

f = 4.792 mm, Fno = 2.800, ω = 30.94°
Unit mm

Surface data

| Surface number i | R | d | Nd | vd |
|---|---|---|---|---|
| (Object) | ∞ | ∞ | | |
| 1 (stop) | ∞ | 0.0000 | | |
| 2* | 1.412 | 0.8547 | 1.52470 | 56.2 (=vd1) |
| 3* | −7.212 | 0.0500 | | |
| 4* | 17.513 | 0.3629 | 1.61420 | 26.0 (=vd2) |
| 5* | 1.677 | 0.3525 | | |
| 6* | −3.289 | 0.5835 | 1.52470 | 56.2 (=vd3) |
| 7* | −3.326 | 0.1084 | | |
| 8* | 232.737 | 1.3942 | 1.52470 | 56.2 (=vd4) |
| 9* | −45.863 | 0.4000 | | |
| 10 | ∞ | 0.3000 | 1.51633 | 64.12 |
| 11 | ∞ | 1.0252 | | |
| (Image plane) | ∞ | | | | f1 = 2.330
f2 = −3.046
f12 = 4.724
f34 = 44.905
da = 0.511
L14 = 3.706

Aspherical surface data

Second surface $k = 7.131351E-01, A_4 = -3.329571E-02, A_6 = -3.025131E-02,$
$A_8 = 6.952348E-02, A_{10} = -9.095330E-02$
Third surface $k = 7.004994E+01, A_4 = 2.254029E-03, A_6 = 3.700801E-01,$
$A_8 = -3.337891E-01, A_{10} = -7.588148E-02$
Fourth surface $k = 0.000000, A_4 = -8.123492E-02, A_6 = 2.096769E-01,$
$A_8 = 1.582786E-01, A_{10} = -6.600632E-01$
Fifth surface $k = -9.407782E-01, A_4 = -6.543800E-02, A_6 = 3.124348E-01,$
$A_8 = -1.747500E-01, A_{10} = -3.055272E-02$
Sixth surface $k = 0.000000, A_4 = -7.554145E-03, A_6 = 1.039733E-01,$
$A_8 = -5.658820E-03, A_{10} = -2.544293E-02, A_{12} = -4.041081E-02,$
$A_{14} = -1.234665E-02, A_{16} = 5.290247E-02$
Seventh surface $k = -2.843598, A_4 = 4.950930E-02, A_6 = 3.078206E-02,$
$A_8 = -3.762001E-03, A_{10} = -4.647388E-03, A_{12} = -1.649726E-03,$
$A_{14} = -1.839471E-04, A_{16} = 2.508097E-04$
Eighth surface $k = 0.000000, A_4 = -2.010199E-02, A_6 = 4.658410E-03,$
$A_8 = -2.335303E-03, A_{10} = 6.661889E-04, A_{12} = 5.253883E-04,$
$A_{14} = 5.670708E-05, A_{16} = -1.032293E-04$
Ninth surface $k = -1.000000E+03, A_4 = -1.804855E-02, A_6 = -1.196299E-02,$
$A_8 = 3.829191E-03, A_{10} = -5.848147E-04, A_{12} = -5.434352E-05,$
$A_{14} = 1.414815E-05, A_{16} = -3.215050E-07$ The values in the respective conditional expressions are as follows:

f1/f2 = −0.765
da/L14 = 0.138
f12/f34 = 0.105
L14/f = 0.773
vd1 = 56.2 f = 4.792 mm, Fno = 2.800, ω = 30.94°
Unit mm vd2 = 26.0
vd3 = 56.2
vd4 = 56.2
|vd1 − vd4| = 0

As described above, the imaging lens according to Numerical Example 2 satisfies the conditional expressions (1) to (8) and the conditional expressions (2A) and (3A).

Figure 5:
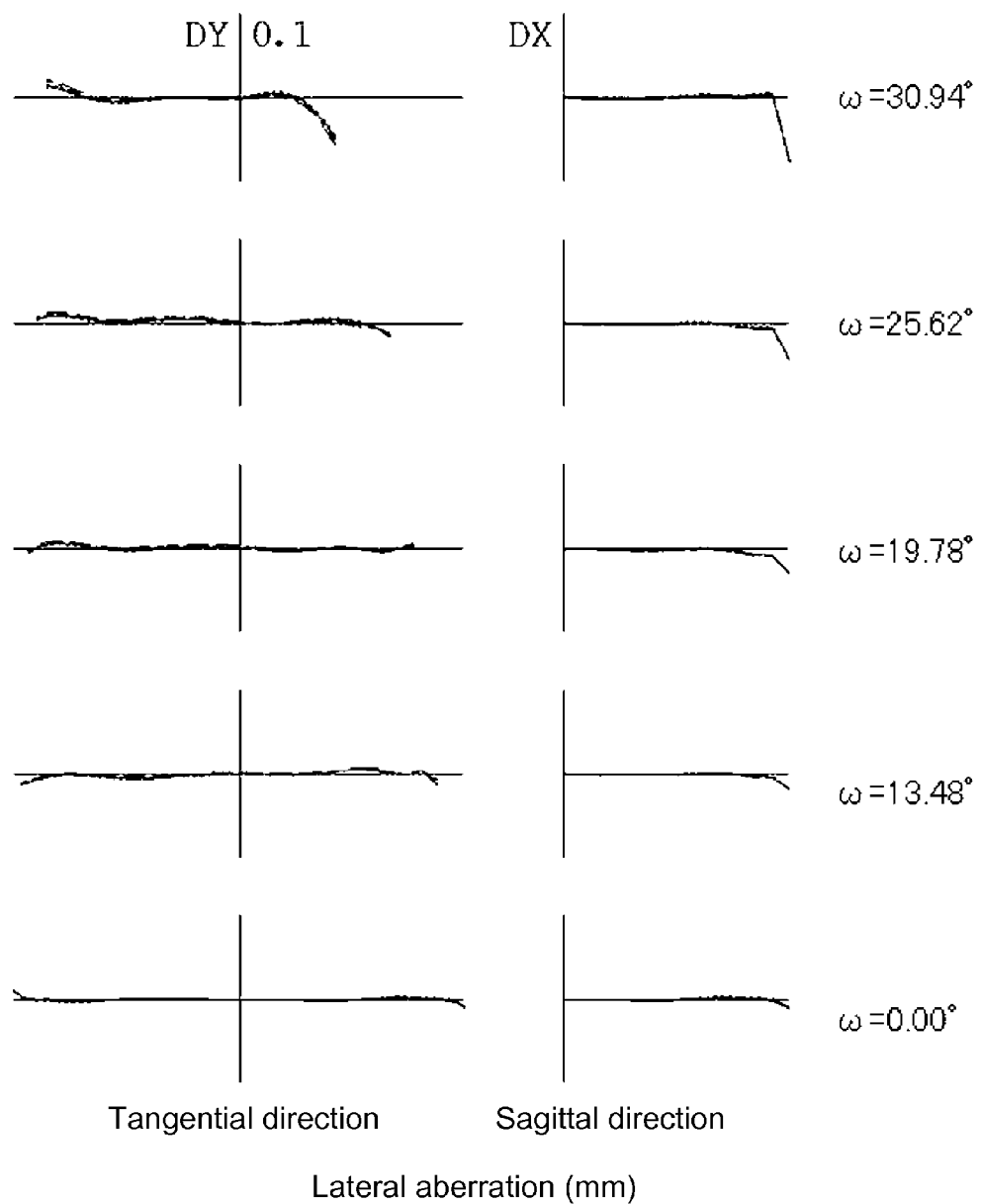
FIG. 5 is an aberration diagram showing lateral aberrations of the imaging lens shown in FIG. 4.
Figure 6:
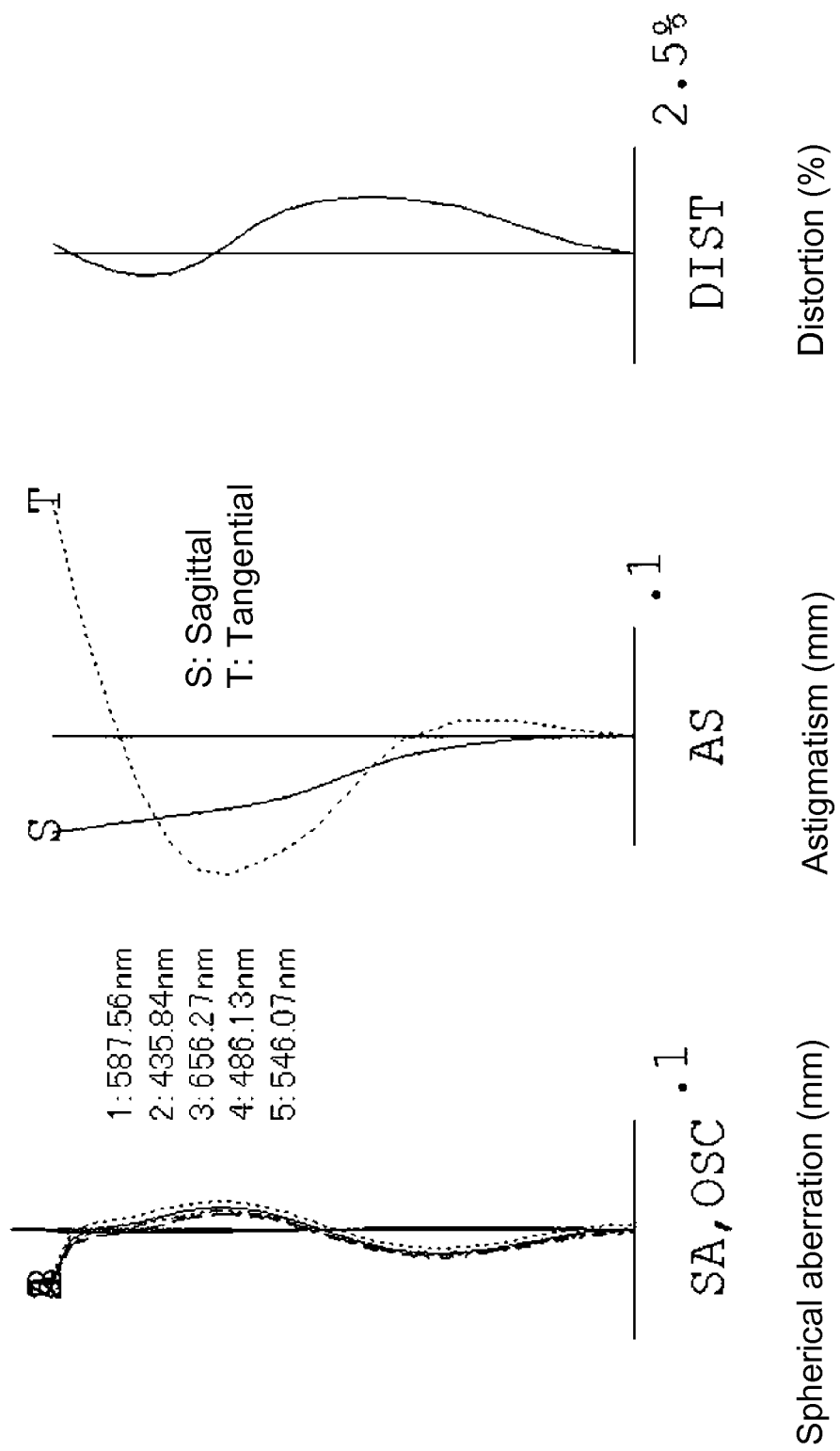
FIG. 6 is an aberration diagram showing spherical aberration, astigmatism, and distortion of the imaging lens shown in FIG. 4.
Figure 7:
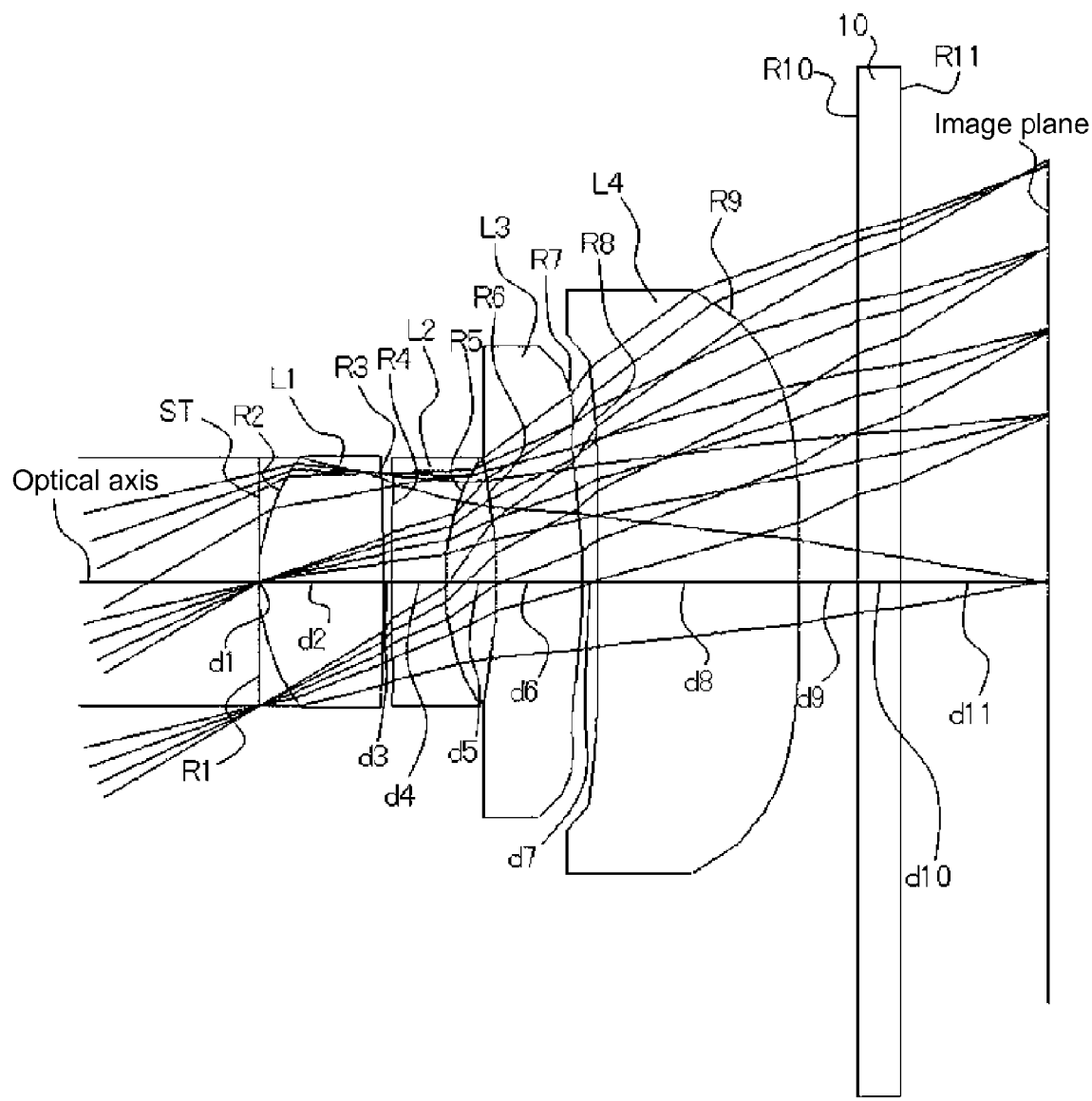
FIG. 7 is a cross-sectional view schematically showing an imaging lens according to Numerical Example 3 of an embodiment of the present invention.

FIG. 5 shows the lateral aberrations corresponding to a half angle of view ω in the imaging lens according to Numerical Example 2. FIG. 6 shows the spherical aberration SA (mm), the astigmatism AS (mm), and the distortion DIST (%). As shown in FIGS. 5 and 6, with the imaging lens according to Numerical Example 2, the image surface is suitably corrected, and respective aberrations are appropriately corrected, as in Numerical Example 1.

NUMERICAL EXAMPLE 3

The basic lens data are as follows:

f = 4.780 mm, Fno = 2.800, ω = 31.00°
Unit mm

Surface data

| Surface number i | R | d | Nd | vd |
|---|---|---|---|---|
| (Object) | ∞ | ∞ | | |
| 1 (stop) | ∞ | 0.0000 | | |
| 2* | 1.411 | 0.8610 | 1.52470 | 56.2 (=vd1) |
| 3* | −7.240 | 0.0500 | | |
| 4* | 17.416 | 0.3683 | 1.61420 | 26.0 (=vd2) |
| 5* | 1.680 | 0.3500 | | |
| 6* | −3.308 | 0.5945 | 1.52470 | 56.2 (=vd3) |
| 7* | −3.364 | 0.1068 | | |
| 8* | 234.698 | 1.3743 | 1.52470 | 56.2 (=vd4) |
| 9* | −50.369 | 0.4000 | | |
| 10 | ∞ | 0.3000 | 1.51633 | 64.12 |
| 11 | ∞ | 1.0069 | | |
| (Image plane) | ∞ | | | | f1 = 2.330
f2 = −3.054
f12 = 4.688
f34 = 49.155
da = 0.507
L14 = 3.705

Aspherical surface data

Second surface $k = 7.124973E-01, A_4 = -3.340274E-02, A_6 = -3.029348E-02,$
$A_8 = 6.979722E-02, A_{10} = -9.045849E-02$
Third surface $k = 6.983134E+01, A_4 = 2.332465E-03, A_6 = 3.712007E-01,$
$A_8 = -3.327910E-01, A_{10} = -7.740465E-02$
Fourth surface $k = 0.000000, A_4 = -8.121136E-02, A_6 = 2.083994E-01,$
$A_8 = 1.571260E-01, A_{10} = -6.573071E-01$
Fifth surface $k = -9.757836E-01, A_4 = -6.636112E-02, A_6 = 3.116588E-01,$
$A_8 = -1.762056E-01, A_{10} = -3.366125E-02$ -continued f = 4.780 mm, Fno = 2.800, ω = 31.00°
Unit mm Sixth surface k = 0.000000, $A_4$ = −8.748924E−03, $A_6$ = 1.037168E−01,
$A_8$ = −3.758805E−03, $A_{10}$ = −2.285585E−02, $A_{12}$ = −4.064712E−02,
$A_{14}$ = −2.194039E−02, $A_{16}$ = 2.286998E−02
Seventh surface k = −2.737729, $A_4$ = 4.928961E−02, $A_6$ = 3.065535E−02,
$A_8$ = −4.016071E−03, $A_{10}$ = −4.828806E−03, $A_{12}$ = −1.726350E−03,
$A_{14}$ = −1.815072E−04, $A_{16}$ = 2.997076E−04
Eighth surface k = 0.000000, $A_4$ = −2.008279E−02, $A_6$ = 4.399177E−03,
$A_8$ = −2.387790E−03, $A_{10}$ = 6.590908E−04, $A_{12}$ = 5.220571E−04,
$A_{14}$ = 5.283383E−05, $A_{16}$ = −1.068386E−04
Ninth surface k = −1.000000E+03, $A_4$ = −1.844311E−02, $A_6$ = −1.172968E−02,
$A_8$ = 3.852888E−03, $A_{10}$ = −5.876908E−04, $A_{12}$ = −5.598068E−05,
$A_{14}$ = 1.371329E−05, $A_{16}$ = −4.070820E−07

The values in the respective conditional expressions are as follows:

f1/f2 = −0.763
da/L14 = 0.137
f12/f34 = 0.095
L14/f = 0.775
vd1 = 56.2
vd2 = 26.0
vd3 = 56.2
vd4 = 56.2
|vd1 − vd4| = 0

As described above, the imaging lens according to Numerical Example 3 satisfies the conditional expressions (1) to (8) and the conditional expressions (2A) and (3A).

Figure 8:
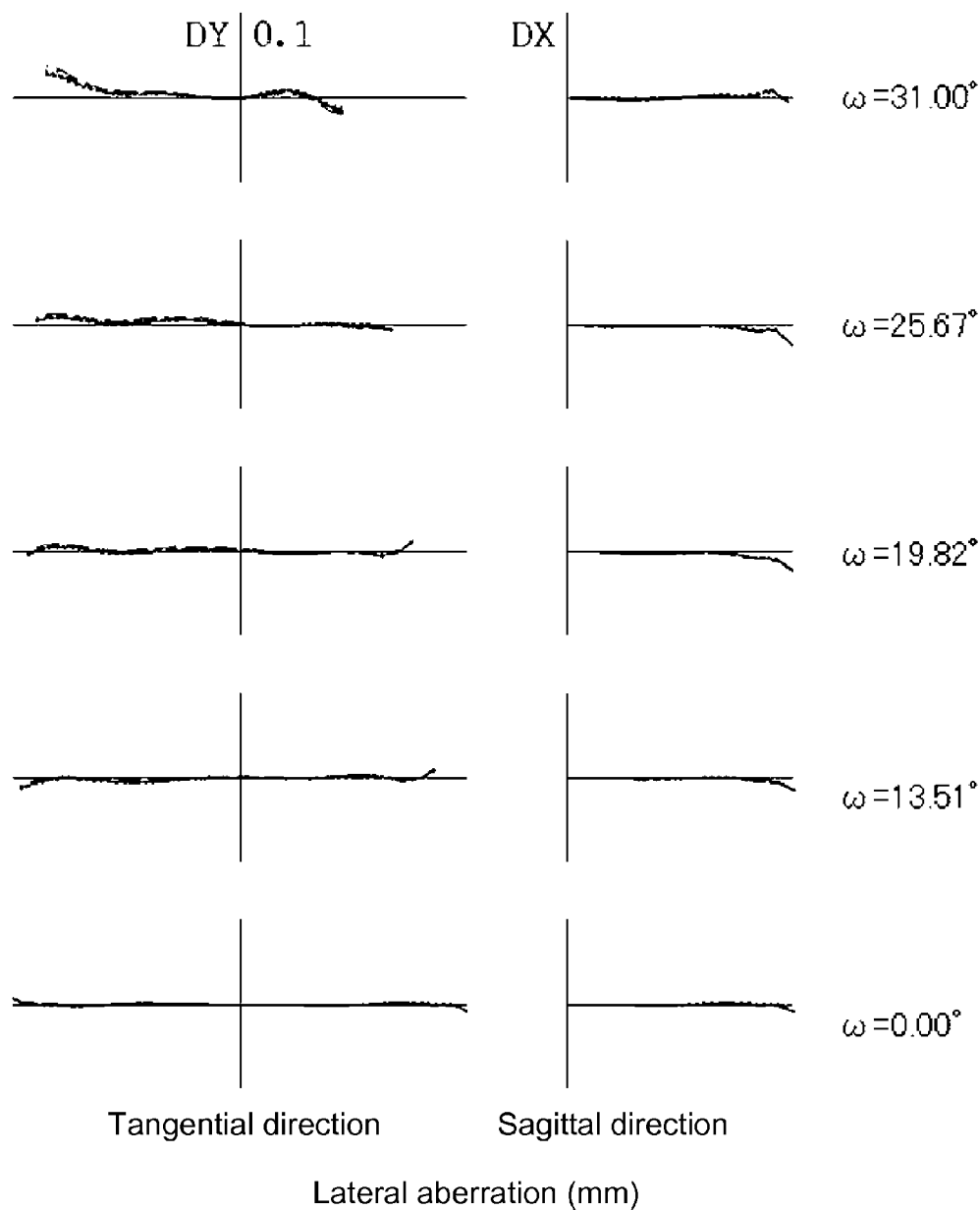
FIG. 8 is an aberration diagram showing lateral aberrations of the imaging lens shown in FIG. 7.
Figure 9:
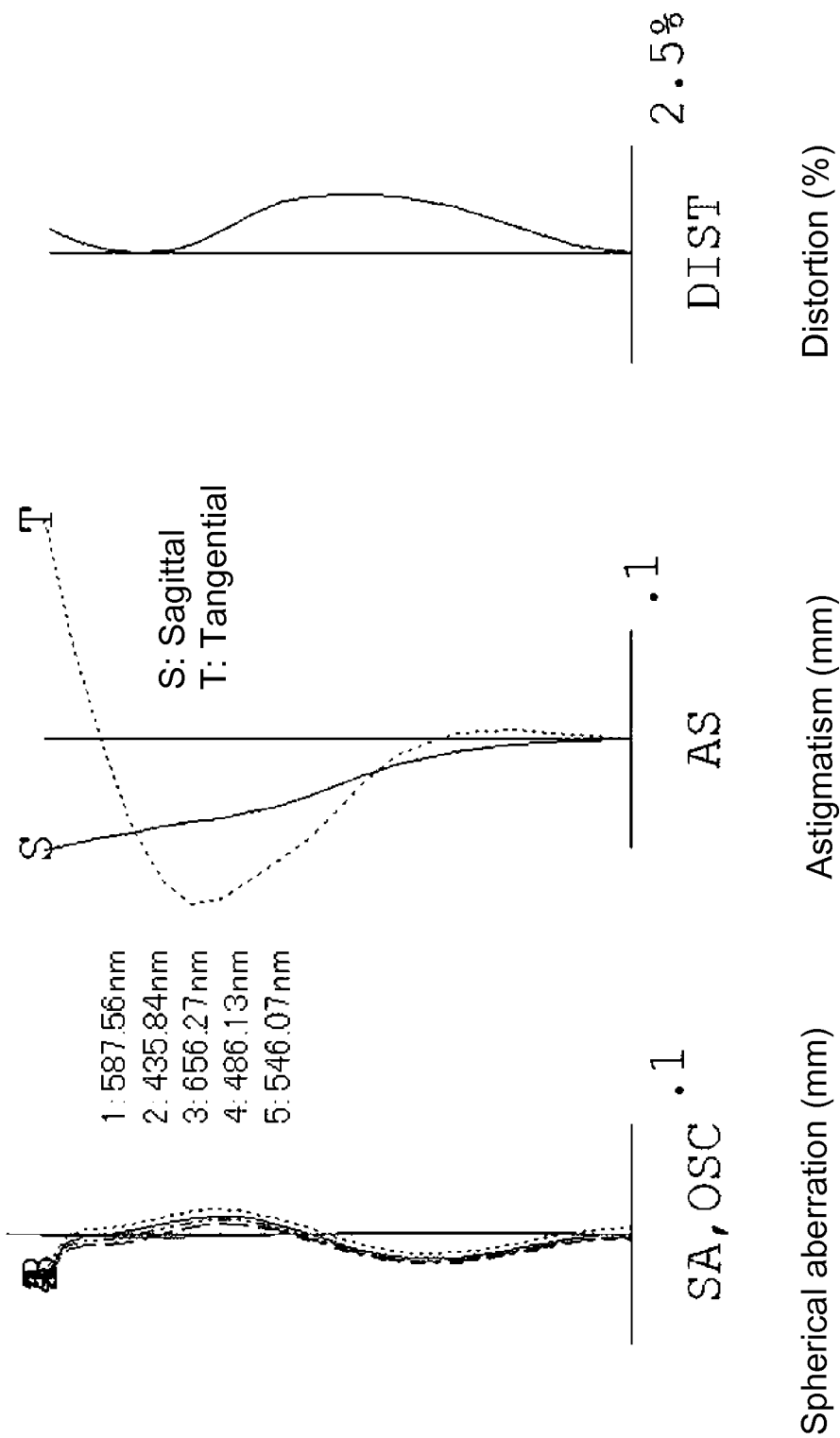
FIG. 9 is an aberration diagram showing spherical aberration, astigmatism, and distortion of the imaging lens shown in FIG. 7.
Figure 10:
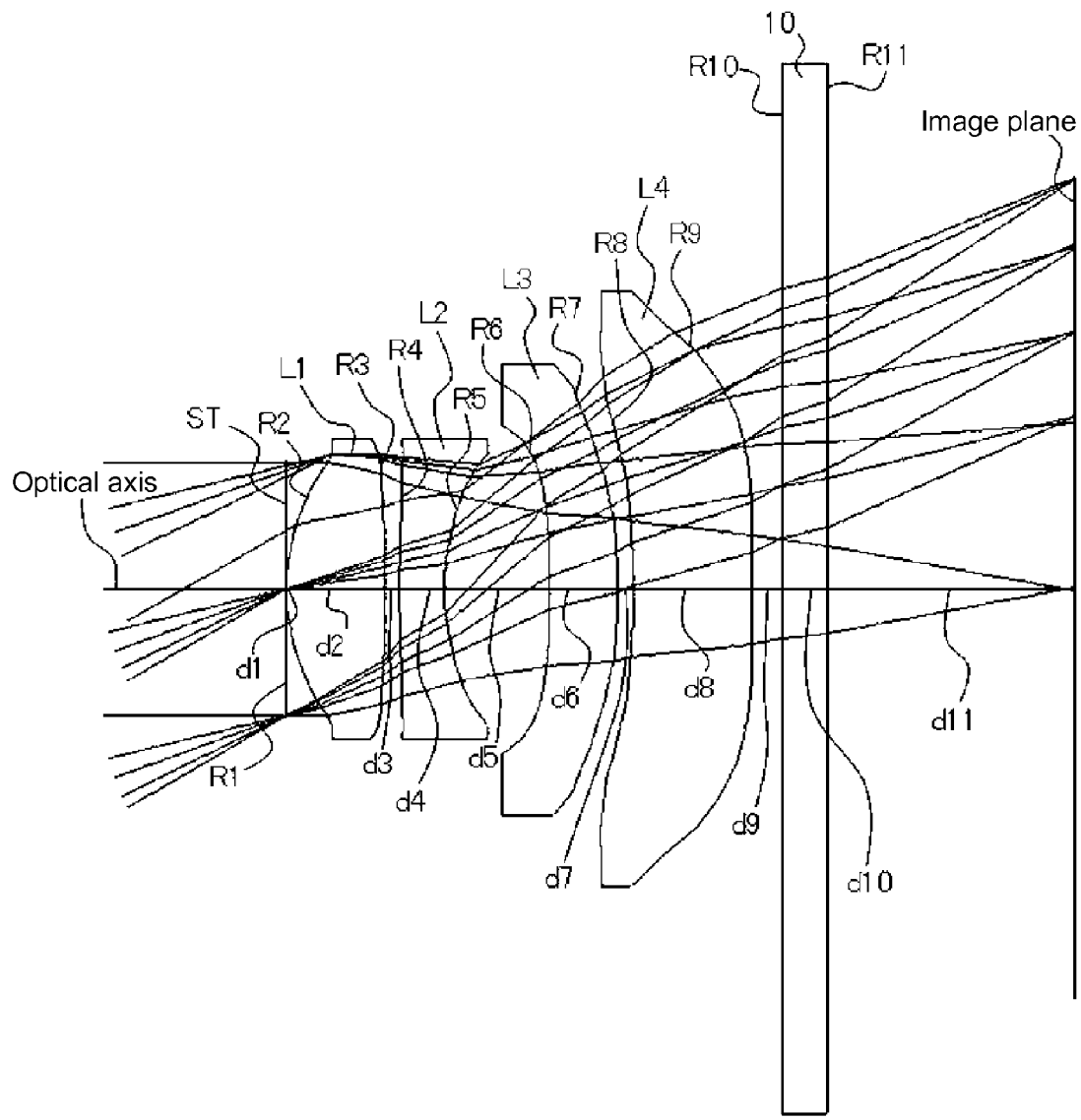
FIG. 10 is a cross-sectional view schematically showing an imaging lens according to Numerical Example 4 of an embodiment of the present invention.

FIG. 8 shows the lateral aberrations corresponding to a half angle of view ω in the imaging lens according to Numerical Example 3. FIG. 9 shows the spherical aberration SA (mm), the astigmatism AS (mm), and the distortion DIST (%). As shown in FIGS. 8 and 9, with the imaging lens according to Numerical Example 3, the image surface is suitably corrected, and respective aberrations are appropriately corrected, as in Numerical Example 1.

Next, Numerical Example 4 of an imaging lens according to this embodiment is described.

NUMERICAL EXAMPLE 4

The basic lens data are as follows:

f = 4.764 mm, Fno = 2.815, ω = 31.08°
Unit mm

Surface data

| Surface number i | R | d | Nd | vd |
|---|---|---|---|---|
| (Object) | ∞ | ∞ | | |
| 1 (stop) | ∞ | 0.0000 | | |
| 2* | 1.435 | 0.6500 | 1.52470 | 56.2 (=vd1) |
| 3* | 30.280 | 0.1000 | | |
| 4* | 4.190 | 0.3000 | 1.61420 | 26.0 (=vd2) |
| 5* | 1.500 | 0.7000 | | |
| 6* | −13.630 | 0.4500 | 1.58470 | 30.0 (=vd3) |
| 7* | −5.680 | 0.1000 | | |
| 8* | 155.000 | 0.8000 | 1.53460 | 56.3 (=vd4) |
| 9* | −100.000 | 0.2000 | | |
| 10 | ∞ | 0.3000 | 1.51633 | 64.12 |
| 11 | ∞ | 1.6457 | | |
| (Image plane) | ∞ | | | | f1 = 2.849
f2 = −3.973
f12 = 5.744
f34 = 14.293
da = 0.900
L14 = 3.100

Aspherical surface data

Second surface k = 0.000000, $A_4$ = 3.557264E−03, $A_6$ = −2.939159E−02,
$A_8$ = 1.301751E−02, $A_{10}$ = 1.301701E−01, $A_{12}$ = −2.929961E−01,
$A_{14}$ = 1.418133E−01
Third surface k = 0.000000, $A_4$ = −1.975936E−01, $A_6$ = 2.785038E−01,
$A_8$ = −1.397215E−02, $A_{10}$ = −2.781911E−01, $A_{12}$ = 3.551117E−02,
$A_{14}$ = 7.581697E−02
Fourth surface k = 0.000000, $A_4$ = −4.224099E−01, $A_6$ = 8.417074E−01,
$A_8$ = −8.766306E−01, $A_{10}$ = 5.495510E−01, $A_{12}$ = −2.537399E−01,
$A_{14}$ = 5.335235E−02
Fifth surface k = 0.000000, $A_4$ = −3.085904E−01, $A_6$ = 6.857857E−01,
$A_8$ = −5.154420E−01, $A_{10}$ = −5.453786E−01, $A_{12}$ = 1.606895,
$A_{14}$ = −9.327949E−01
Sixth surface k = 0.000000, $A_4$ = −2.604538E−01, $A_6$ = 5.333212E−01,
$A_8$ = −7.780920E−01, $A_{10}$ = 5.195351E−01, $A_{12}$ = −1.659964E−01
Seventh surface k = 0.000000, $A_4$ = −2.493735E−01, $A_6$ = 3.459725E−01,
$A_8$ = −2.662888E−01, $A_{10}$ = 1.119992E−01, $A_{12}$ = −1.953619E−02
Eighth surface k = 0.000000, $A_4$ = −1.880089E−01, $A_6$ = 9.282069E−02,
$A_8$ = −4.447643E−03, $A_{10}$ = −6.306204E−03, $A_{12}$ = 1.379567E−03,
$A_{14}$ = −6.846129E−05
Ninth surface k = 0.000000, $A_4$ = −4.798368E−02, $A_6$ = −1.695288E−02,
$A_8$ = 9.261266E−03, $A_{10}$ = −3.865081E−04, $A_{12}$ = −9.596691E−04,
$A_{14}$ = 1.844111E−04

The values in the respective conditional expressions are as follows:

f1/f2 = −0.717
da/L14 = 0.290
f12/f34 = 0.402
L14/f = 0.651
vd1 = 56.2
vd2 = 26.0
vd3 = 30.0
vd4 = 56.3
|vd1 − vd4| = 0.1

As described above, the imaging lens according to Numerical Example 4 satisfies the conditional expressions (1) to (8).

Figure 11:
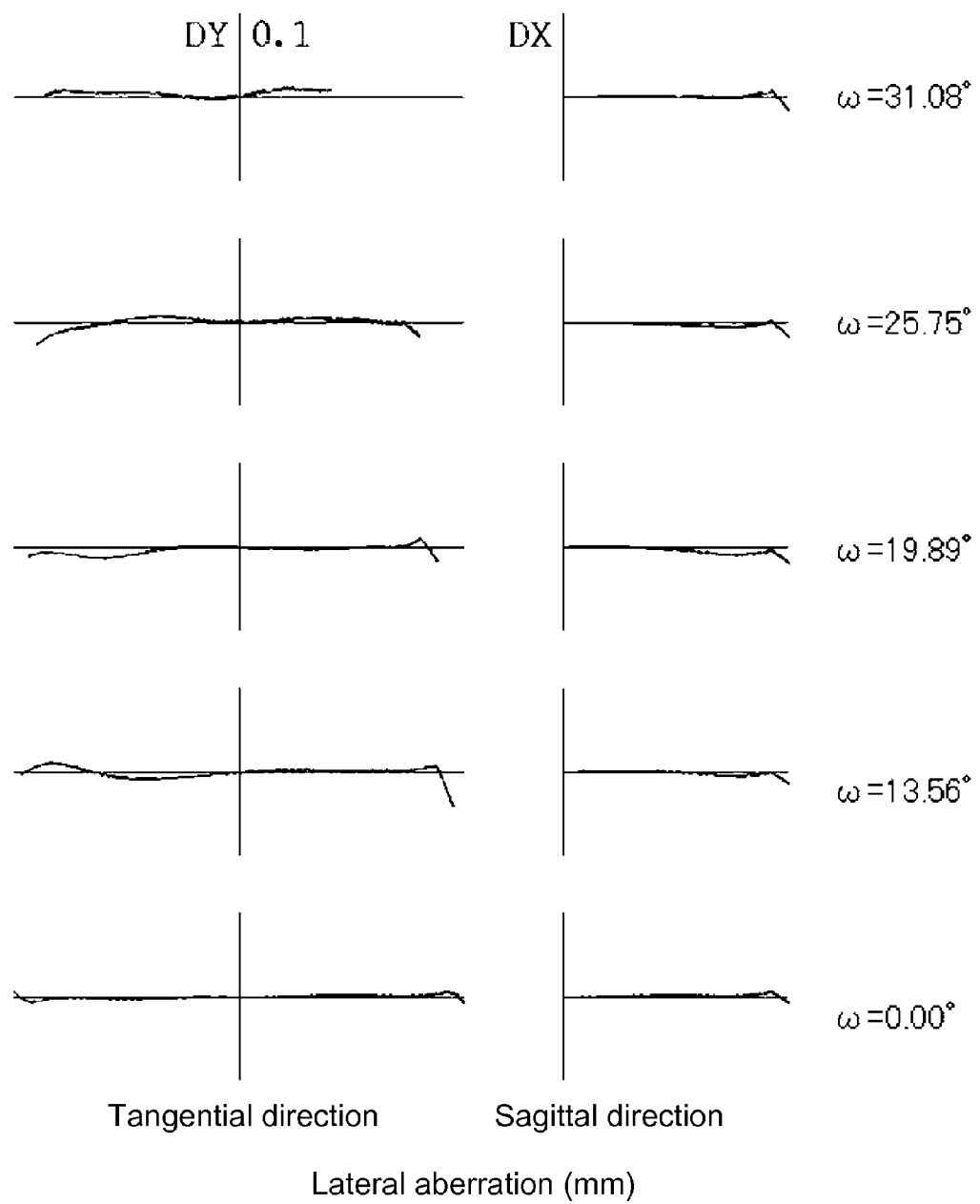
FIG. 11 is an aberration diagram showing lateral aberrations of the imaging lens shown in FIG. 10.
Figure 12:
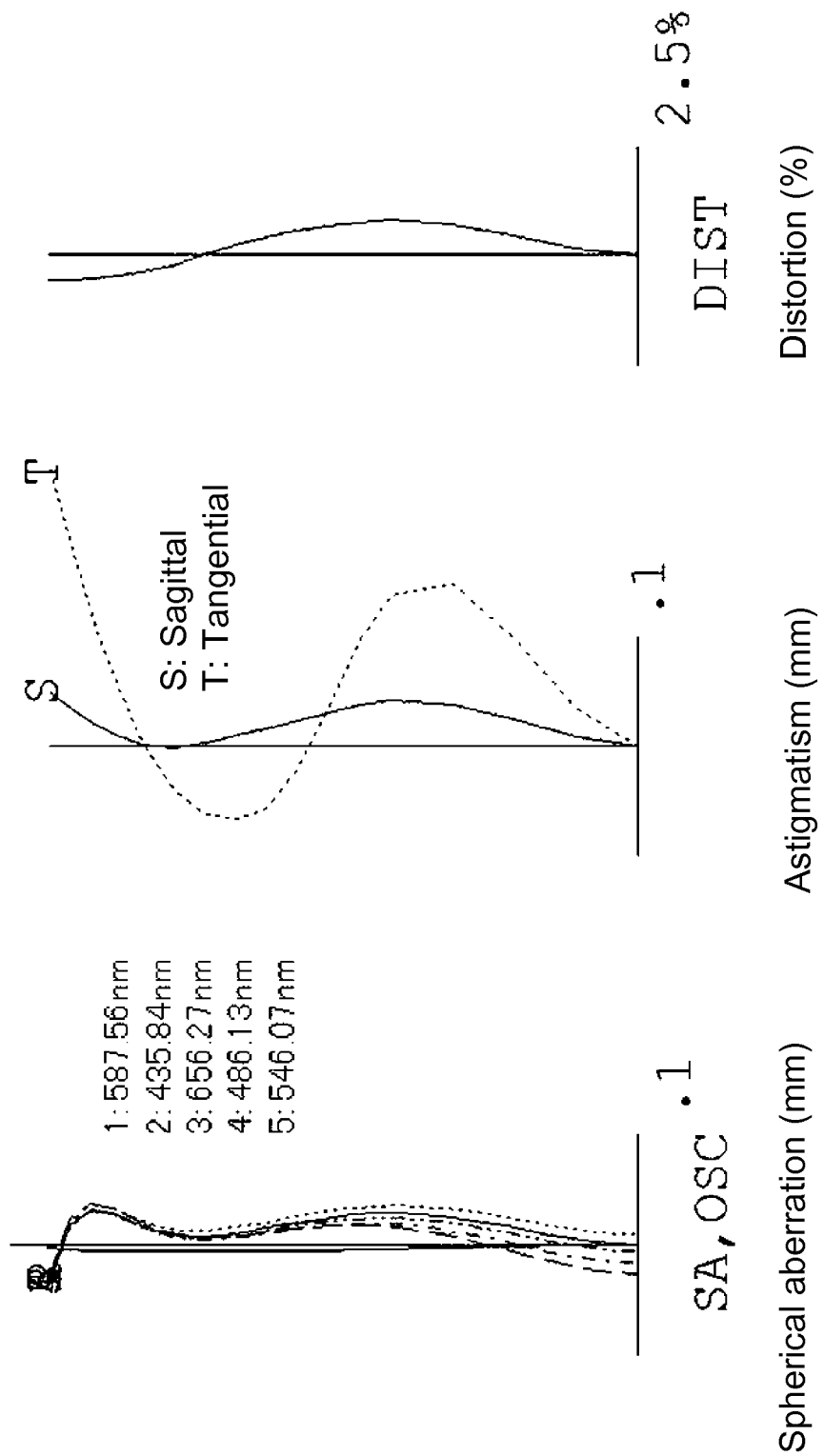
FIG. 12 is an aberration diagram showing spherical aberration, astigmatism, and distortion of the imaging lens shown in FIG. 10.
Figure 13:
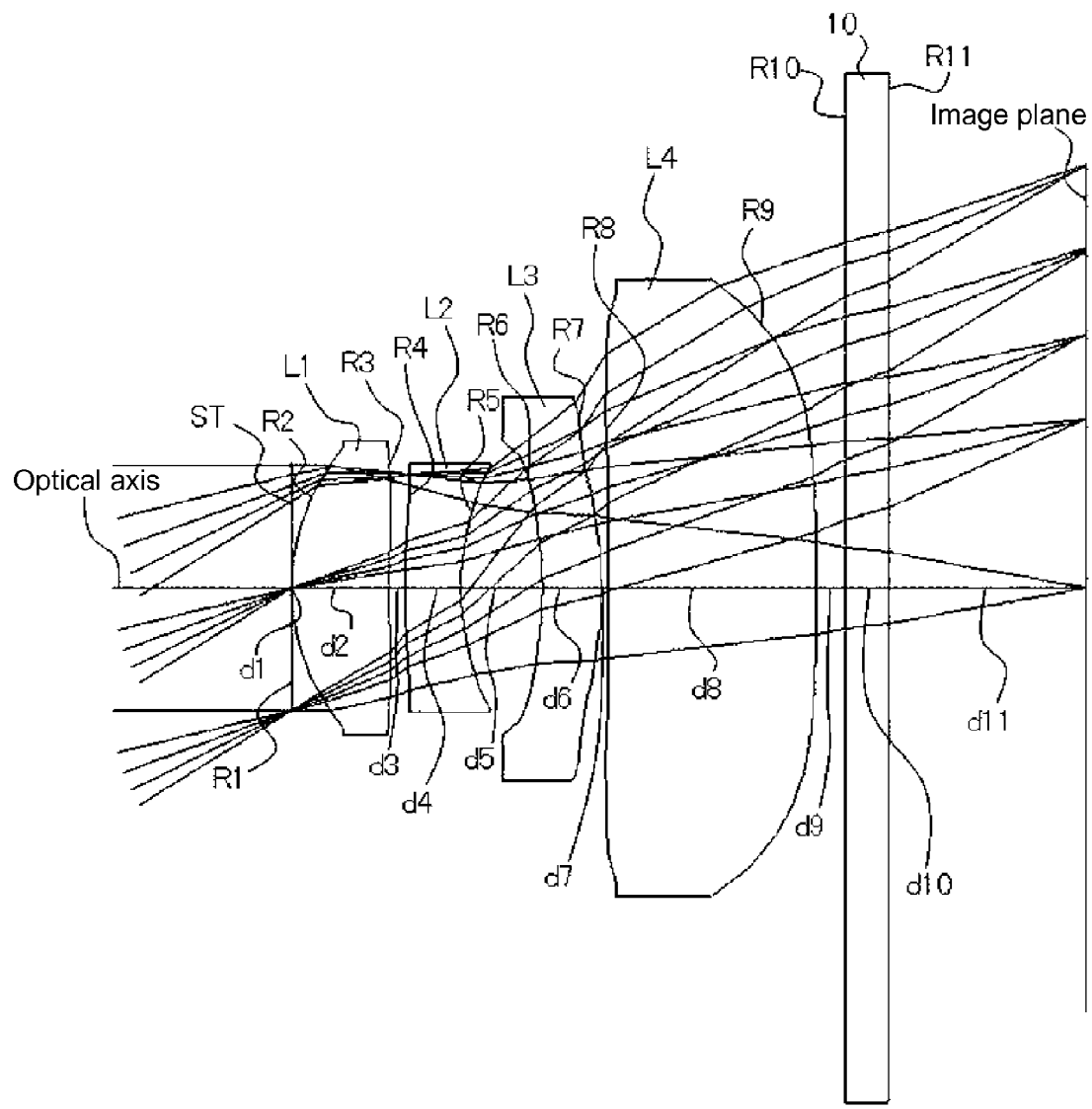
FIG. 13 is a cross-sectional view schematically showing an imaging lens according to Numerical Example 5 of an embodiment of the present invention.

FIG. 11 shows the lateral aberrations corresponding to a half angle of view ω in the imaging lens according to Numerical Example 4. FIG. 12 shows the spherical aberration SA (mm), the astigmatism AS (mm), and the distortion DIST (%). As shown in FIGS. 11 and 12, with the imaging lens according to Numerical Example 4, the image surface is suitably corrected, and respective aberrations are appropriately corrected, as in Numerical Example 1.

Next, Numerical Example 5 of an imaging lens according to this embodiment is described. An imaging lens according to Numerical Example 5 further satisfies the following conditional expression (9):

$$|vd2-vd3|<10 \qquad (9)$$

In the imaging lens according to Numerical Example 5, the first lens L1 and the fourth lens L4 are made of the same material, and the second lens L2 and the third lens L3 are made of the same material. Therefore, the imaging lens according to Numerical Example 5 satisfies the conditions, "the Abbe number vd1 of the first lens L1=the Abbe number vd4 of the fourth lens L4" and "the Abbe number vd2 of the second lens L2=the Abbe number vd3 of the third lens L3."

NUMERICAL EXAMPLE 5

The basic lens data are as follows:

f = 4.694 mm, Fno = 2.815, ω = 31.46°
Unit mm

Surface data

| Surface number i | R | d | Nd | vd |
|---|---|---|---|---|
| (Object) | ∞ | ∞ | | |
| 1 (stop) | ∞ | 0.0000 | | |
| 2* | 1.463 | 0.6624 | 1.52470 | 56.2 (=vd1) |
| 3* | 9.018 | 0.1000 | | |
| 4* | 3.158 | 0.3840 | 1.61420 | 26.0 (=vd2) |
| 5* | 1.605 | 0.5540 | | |
| 6* | −3.029 | 0.3998 | 1.61420 | 26.0 (=vd3) |
| 7* | −2.987 | 0.0500 | | |
| 8* | 20.341 | 1.4069 | 1.52470 | 56.2 (=vd4) |
| 9* | −100.001 | 0.2000 | | |
| 10 | ∞ | 0.3000 | 1.51633 | 64.12 |
| 11 | ∞ | 1.3279 | | |
| (Image plane) | ∞ | | | | f1 = 3.231
f2 = −5.866
f12 = 5.024
f34 = 21.947
da = 0.704
L14 = 3.557

Aspherical surface data

Second surface k = 3.069060E−01, $A_4$ = −1.485998E−02, $A_6$ = 1.151919E−02,
$A_8$ = −2.442641E−02
Third surface k = −7.160359E+02, $A_4$ = −6.033441E−02, $A_6$ = 2.895241E−02,
$A_8$ = −8.510955E−03
Fourth surface k = −6.028629E+01, $A_4$ = −6.614940E−02, $A_6$ = −3.122196E−02,
$A_8$ = 6.243920E−02
Fifth surface k = 2.525580E−02, $A_4$ = −1.556932E−01, $A_6$ = 3.067661E−01,
$A_8$ = −7.669839E−01, $A_{10}$ = 1.967142, $A_{12}$ = −3.332530,
$A_{14}$ = 3.177894, $A_{16}$ = −1.191580
Sixth surface k = 0.000000, $A_4$ = −3.124156E−02, $A_6$ = 8.980145E−02,
$A_8$ = −6.401821E−02, $A_{10}$ = 4.144297E−01, $A_{12}$ = −1.852801,
$A_{14}$ = 2.585897, $A_{16}$ = −1.238748

-continued f = 4.694 mm, Fno = 2.815, ω = 31.46°
Unit mm

Seventh surface k = −7.531006, $A_4$ = −1.101156E−01, $A_6$ = 2.355281E−01,
$A_8$ = −1.876796E−01, $A_{10}$ = 9.394495E−02, $A_{12}$ = −1.638100E−02,
$A_{14}$ = −1.206296E−02, $A_{16}$ = 4.630250E−03
Eighth surface k = 0.000000, $A_4$ = −9.467843E−02, $A_6$ = 6.561382E−02,
$A_8$ = −1.054401E−02, $A_{10}$ = −4.397847E−03, $A_{12}$ = 2.067682E−03,
$A_{14}$ = −3.350817E−04, $A_{16}$ = 2.265124E−05
Ninth surface k = 0.000000, $A_4$ = −1.426804E−02, $A_6$ = −1.929451E−02,
$A_8$ = 7.233309E−03, $A_{10}$ = −3.950894E−05, $A_{12}$ = −7.622066E−04,
$A_{14}$ = 1.968331E−04, $A_{16}$ = −1.538948E−05

The values in the respective conditional expressions are as follows:

f1/f2 = −0.551
da/L14 = 0.198
f12/f34 = 0.229
L14/f = 0.758
vd1 = 56.2
vd2 = 26.0
vd3 = 26.0
vd4 = 56.2
|vd1 − nd4| = 0

As described above, the imaging lens according to Numerical Example 5 satisfies the conditional expressions (1) to (9) and the conditional expressions (2A) and (3A).

In the imaging lens according to Numerical Example 5, the material of the first lens L1 and the material of the fourth lens L4 are the same, and the material of the second lens L2 and the material of the third lens L3 are the same. Accordingly, the imaging lens production cost can be lowered while respective aberrations are appropriately corrected.

Figure 14:
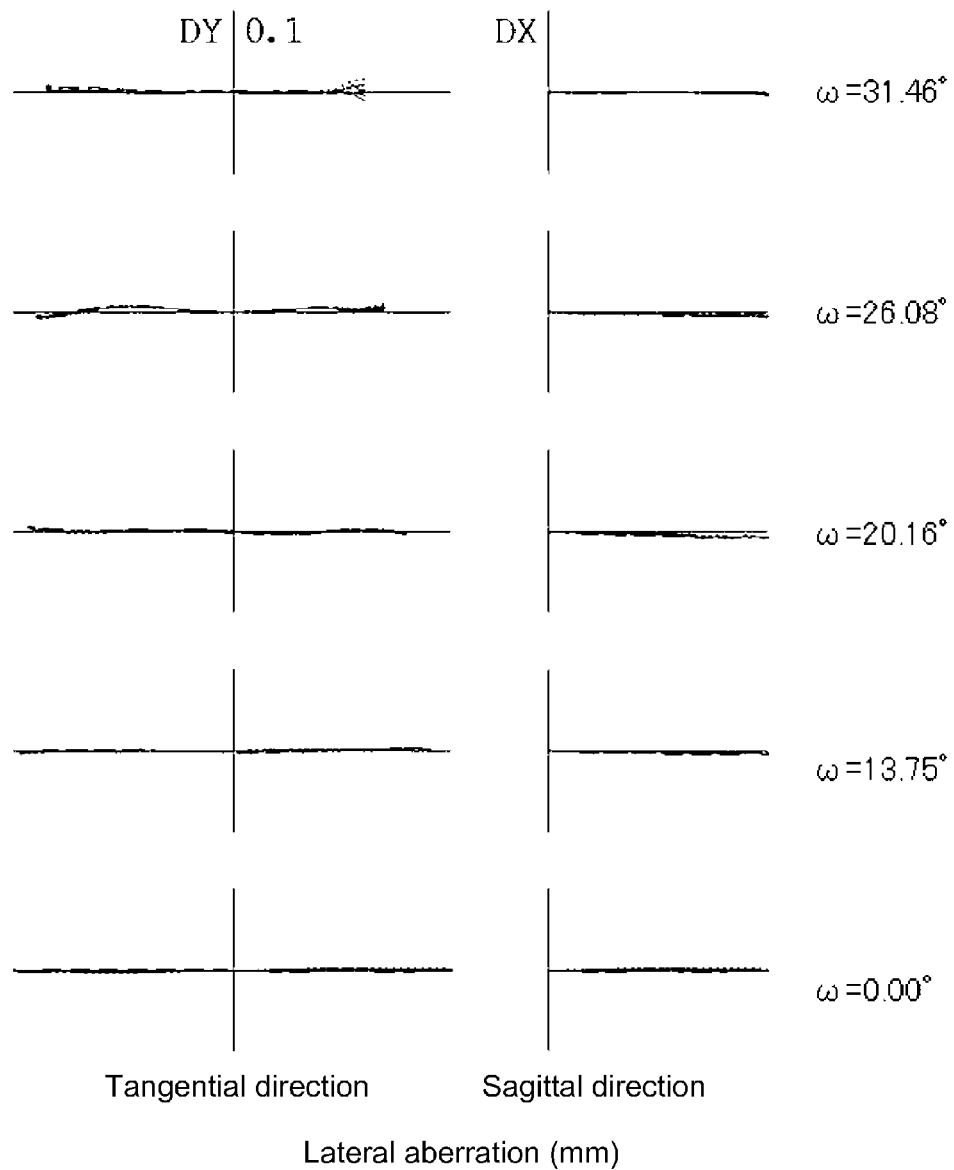
FIG. 14 is an aberration diagram showing lateral aberrations of the imaging lens shown in FIG. 13.
Figure 15:
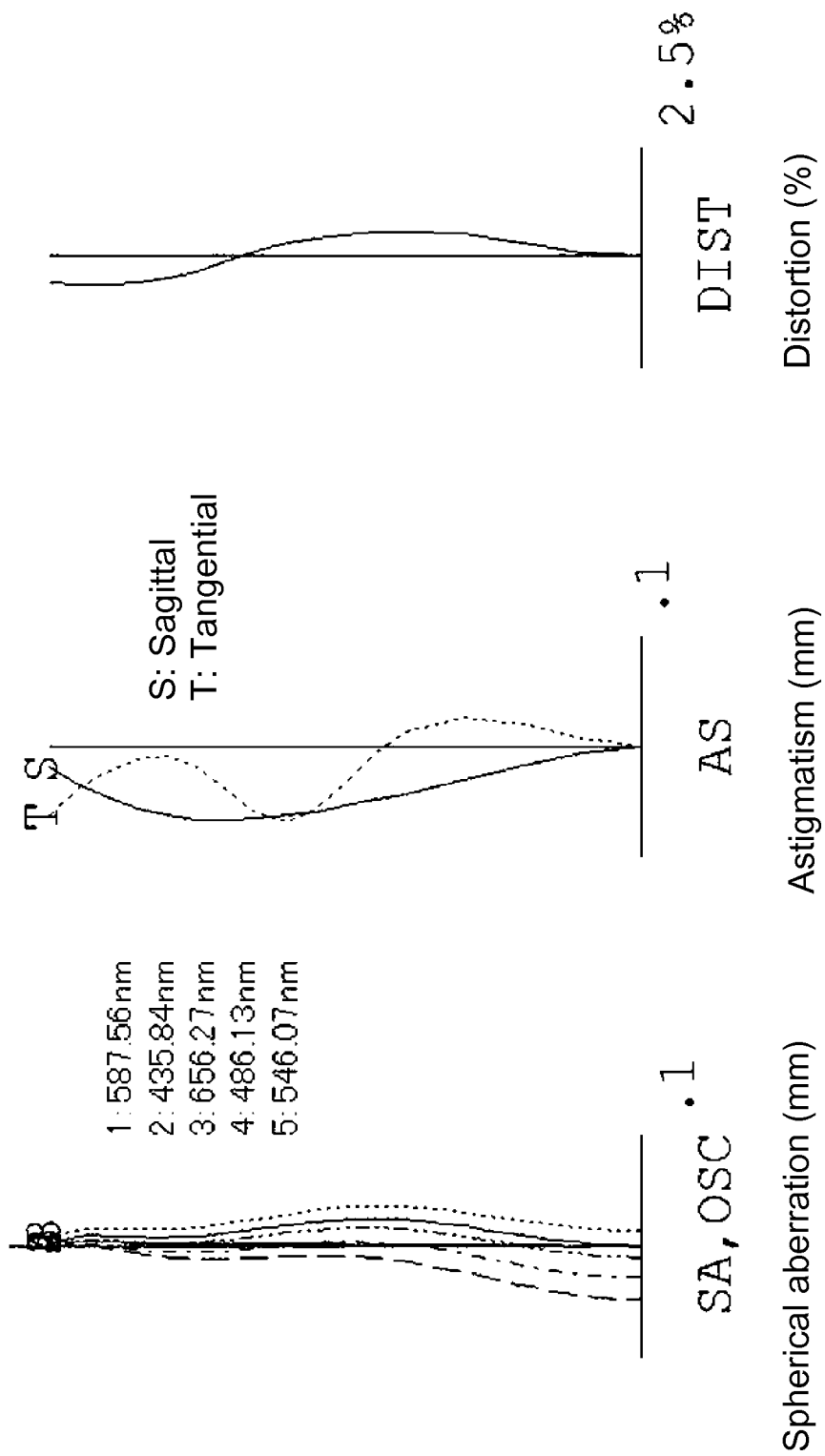
FIG. 15 is an aberration diagram showing spherical aberration, astigmatism, and distortion of the imaging lens shown in FIG. 13.

FIG. 14 shows the lateral aberrations corresponding to a half angle of view ω in the imaging lens according to Numerical Example 5. FIG. 15 shows the spherical aberration SA (mm), the astigmatism AS (mm), and the distortion DIST (%). As shown in FIGS. 14 and 15, with the imaging lens according to Numerical Example 5, the image surface is suitable corrected, and respective aberrations are appropriately corrected, as in Numerical Example 1.

In the imaging lenses according to this embodiment, all the lenses are made of plastic materials. Conventionally, the first lens having high refractive power is normally made of a glass material. However, a glass material has the problem of a high imaging lens production cost, requiring a higher overall cost for lens molding than a plastic material. In the imaging lenses according to this embodiment, on the other hand, all the lenses are made of plastic materials, and the production cost can be suitably lowered.

Accordingly, in cases where an imaging lens according to the above described embodiment is applied to an imaging optical system such as a cellular phone, a digital still camera, a portable information terminal, a security camera, an in-vehicle camera, or a network camera, the camera or the like can be made to have more sophisticated functions, and can also be made smaller in size.

Industrial Applicability

The present invention can be applied to devices that are required to be small as imaging lenses and to be capable of performing excellent aberration corrections. For example, the present invention can be applied to imaging lenses mounted on devices such as cellular phones and digital still cameras.

What is claimed is:

1. An imaging lens comprising:
a first lens having positive refractive power;
a second lens having negative refractive power;
a third lens having positive refractive power; and
a fourth lens having positive refractive power, said first to fourth lenses being arranged in an order from an object side to an image plane side,
wherein said first lens is formed in a shape so that a curvature radius of a surface thereof on the object side is positive,
said second lens is formed in a shape so that a curvature radius of a surface thereof on the object side and a curvature radius of a surface thereof on the image plane side are both positive,
said third lens is formed in a shape so that a curvature radius of a surface thereof on the object side and a curvature radius of a surface thereof on the image plane side are both negative, and
said fourth lens is formed in a shape so that a curvature radius of a surface thereof on the object side is positive, and a curvature radius of a surface thereof on the image plane side is negative.

2. The imaging lens according to claim 1, wherein said first lens is configured to have the refractive power higher than that of the second lens, the third lens, and the fourth lens.

3. The imaging lens according to claim 1, wherein said first lens is configured to have a focal length f1, and said second lens is configured to have a focal length f2 so that the following condition is satisfied:

$-0.9 < f1/f2 < -0.5.$

4. The imaging lens according to claim 1, wherein said first lens, said second lens, said third lens, and said fourth lens are arranged so that the following condition is satisfied:

$0.1 < da/L14 < 0.4,$ where da is a sum of a distance from a surface of the first lens on the image plane side to the surface of the second lens on the object side on an optical axis thereof, a distance from the surface of the second lens on the image plane side to the surface of the third lens on the object side on the optical axis, and a distance from the surface of the third lens on the image plane side to the surface of the fourth lens on the object side on the optical axis, and L14 is a distance from the surface of the first lens on the object side to the surface of the fourth lens on the image plane side on the optical axis.

5. The imaging lens according to claim 1, wherein said first lens, said second lens, said third lens, and said fourth lens are formed so that the following condition is satisfied:

$0.05 < f12/f34 < 0.5,$ where f12 is a composite focal length of the first lens and the second lens, and f34 is a composite focal length of the third lens and the fourth lens.

6. The imaging lens according to claim 1, wherein said first lens, said second lens, said third lens, and said fourth lens are arranged so that the following condition is satisfied:

$0.5 < L14/f < 0.8,$ where f is a focal length of a whole lens system, and L14 is a distance from the surface of the first lens on the object side to the surface of the fourth lens on the image plane side on an optical axis thereof.

7. The imaging lens according to claim 1, wherein said first lens, said second lens, said third lens, and said fourth lens are formed so that the following conditions are satisfied:

$50 < vd1 < 85,$ $vd2 < 30,$ and $50 < vd4 < 85,$ where vd1 is an Abbe number of the first lens, vd2 is an Abbe number of the second lens, and vd4 is an Abbe number of the fourth lens.

8. The imaging lens according to claim 7, wherein said first lens and said fourth lens are formed so that the following condition is satisfied:

$|vd1 - vd4| < 10.$

9. The imaging lens according to claim 7, wherein said second lens and said third lens are formed so that the following condition is satisfied:

$|vd2 - vd3| < 10,$ where vd3 is an Abbe number of the third lens.

* * * * *

UNITED STATES PATENT AND TRADEMARK OFFICE
CERTIFICATE OF CORRECTION

PATENT NO. : 8,477,435 B2  
APPLICATION NO. : 13/478762  
DATED : July 2, 2013  
INVENTOR(S) : Yoji Kubota et al.

Page 1 of 1

It is certified that error appears in the above-identified patent and that said Letters Patent is hereby corrected as shown below:

Title page, Item (73), Assignee: add -- Kantatsu Co., Ltd., Tochigi (JP) --.

Signed and Sealed this  
Twelfth Day of November, 2013

Teresa Stanek Rea  
*Deputy Director of the United States Patent and Trademark Office*